United States Patent
Sinicco et al.

(10) Patent No.: US 8,962,973 B2
(45) Date of Patent: Feb. 24, 2015

(54) MOUNTING INTERFACE FOR A PHOTOVOLTAIC MODULE

(75) Inventors: Ivan Sinicco, Pfaffikon (CH); Andreas Huegli, Seewis (CH); Jurgen Josef Dillmann, Kressbronn (DE)

(73) Assignee: Tel Solar AG, Trubbach (CH)

( * ) Notice: Subject to any disclaimer, the term of this patent is extended or adjusted under 35 U.S.C. 154(b) by 163 days.

(21) Appl. No.: 13/516,456

(22) PCT Filed: Dec. 17, 2010

(86) PCT No.: PCT/EP2010/070066
§ 371 (c)(1),
(2), (4) Date: Oct. 29, 2012

(87) PCT Pub. No.: WO2011/073385
PCT Pub. Date: Jun. 23, 2011

(65) Prior Publication Data
US 2013/0037075 A1    Feb. 14, 2013

Related U.S. Application Data

(60) Provisional application No. 61/287,312, filed on Dec. 17, 2009.

(51) Int. Cl.
*H02N 6/00* (2006.01)
*H01L 31/042* (2014.01)
(Continued)

(52) U.S. Cl.
CPC ........... *H01L 31/0422* (2013.01); *F24J 2/5254* (2013.01); *H01L 31/0482* (2013.01);
(Continued)

(58) Field of Classification Search
CPC .................. H01L 31/0422; H01L 31/0482

USPC .................................. 136/251, 259
See application file for complete search history.

(56) References Cited

U.S. PATENT DOCUMENTS 4,188,145 A    2/1980  Poling
6,201,181 B1 *  3/2001  Azzam et al. ............ 136/244
(Continued)

FOREIGN PATENT DOCUMENTS

WO    WO 99/63193        12/1999
WO    WO 2009/015106      1/2009
WO    WO 2010065614 A1 *  6/2010

OTHER PUBLICATIONS

International Bureau, International Search Report for International Application No. PCT/EP/2010/070066, Nov. 29, 2011, pp. 1-4, Geneva, Switzerland.
(Continued)

*Primary Examiner* — Eli Mekhlin
(74) *Attorney, Agent, or Firm* — Ohlandt, Greeley, Ruggiero and Perle, LLP

(57) ABSTRACT

The invention relates to a mounting interface configured for a photovoltaic module (1) comprising a backside (2) having an overall backside surface size (4, 5), the mounting interface comprising at least six mounting elements (3) attachable to the backside (2) of the photovoltaic module (1) for mounting the photovoltaic module (1) on a mounting surface, wherein each mounting element (3) comprises a mounting element surface having an overall mounting element surface size (6, 7) such that the contact area between the photovoltaic module (1) and the mounting element (3), when attached to the photovoltaic module (1), equals the overall mounting element surface size (6, 7), and the overall backside surface size (4, 5) of the photovoltaic module (1) divided by the summarized overall mounting element surface size (6, 7) of all mounting elements (3) is ≥40 and ≤160, preferably ≥50 and ≤80, more preferably 52. The invention provides for reducing the size of each mounting element (3) such that the overall amount of material required for the mounting is reduced, resulting in minimized material costs.

12 Claims, 3 Drawing Sheets

(51) Int. Cl.
*F24J 2/52* (2006.01)
*H01L 31/048* (2014.01)

(52) U.S. Cl.
CPC .......... *F24J2002/5298* (2013.01); *Y02B 10/12* (2013.01); *Y02B 10/20* (2013.01); *Y02E 10/50* (2013.01); *Y02E 10/47* (2013.01)
USPC ........................................................ 136/251

(56) References Cited

U.S. PATENT DOCUMENTS

2004/0084578 A1    5/2004  Cho et al.
2005/0284515 A1*  12/2005  Stevens et al. ................. 136/251
2006/0249545 A1*  11/2006  Ramsey ......................... 222/494
2009/0114270 A1*   5/2009  Stancel .......................... 136/251
2009/0205703 A1    8/2009  Umotoy

OTHER PUBLICATIONS

International Bureau, English Translation of the Written Opinion of the International Search Authority for International Application No. PCT/EP/2010/070066, Jun. 17, 2012, pp. 1-7, Geneva, Switzerland.

International Bureau, English Translation of International Preliminary Report on Patentability Chapter I for International Application No. PCT/EP/2010/070066, Jun. 19, 2012, pp. 1-8, Geneva, Switzerland.

* cited by examiner

MOUNTING INTERFACE FOR A PHOTOVOLTAIC MODULE

CROSS-REFERENCE TO RELATED APPLICATIONS

This application is a United States national stage entry of International application ser. no. PCT/EP2010/070066 filed Dec. 17, 2010, which claims priority to U.S. Ser. No. 61/287,312 filed Dec. 17, 2009. The contents of both of these prior applications are incorporated herein by reference in their entirety as if set forth verbatim.

FIELD

The invention relates to a mounting interface configured for a photovoltaic module comprising a plurality of mounting elements attachable to a backside of the photovoltaic module. The invention relates further to a photovoltaic module with the mounting interface for mounting the photovoltaic module on a mounting surface.

BACKGROUND

Solar cells, also known as photovoltaic cells, are semiconductors that convert electromagnetic energy, such as light or solar radiation, directly to electricity. Photovoltaic energy conversion offers the perspective to provide for an environmentally friendly means to generate electricity.

However, at present state, electric energy provided by photovoltaic energy conversion is still more expensive than electricity provided by conventional power stations. Therefore, the development of more cost effective means for producing photovoltaic energy conversion units attracted attention in recent years. Amongst different approaches of producing low cost solar cells, thin-film silicon solar cells are regarded an important approach for achieving that goal.

A plurality of individual cells arranged on a common base and electrically connected is called a module, a solar module or a photovoltaic module, be it based on thin-film silicon or crystalline technology. Such modules are normally being grouped to larger installations, for example on roofs, building walls or on open grounds to constitute a solar power plant.

In view of this variety of fastening needs, the question of appropriate and cost-conscious fixation technologies becomes relevant, as the fixation technologies shall compensate forces coming from wind, rain, snow or alike. Further aspects for appropriate fixation technologies are easy maintenance and trouble-free replacement of damaged modules.

Various module fixation technologies are commercially available today. In order to fix the photovoltaic module, all these structures have in common the need for a well-designed supporting structure and tools to mount the photovoltaic module over the mentioned structure. This will not only sustain the weight of the module, but this will also provide possible fixation points in order to "clamp" and/or "screw" the module in such a way that the photovoltaic module can compensate wind and snow loads. The bigger, larger and/or heavier a photovoltaic module is, the more heavy and complex must be the structure to fix the photovoltaic module in a reliable way.

In most cases, a photovoltaic module is mounted in an inclined position. A substructure commonly used to mount the photovoltaic module comprises horizontal supports, for example a frame support at the edge and a middle support, so-called back rails, i.e. bars made from steel or aluminum profile, glued or clamped to a backside of the photovoltaic module. The clamps often grasp the edges of a module, eventually in connection with a frame enclosing the edges of the photovoltaic module. Such fixation avoids heavy back rails, but is not easy to maintain, as a lot of different parts are necessary to fixate the photovoltaic module to the support structure and several tools are needed for the installation of the photovoltaic module when using commonly known mounting techniques.

The main disadvantages are related to the cost associated to these structures, because the quantity of different materials used is quite high. In fact, a frame uses the whole photovoltaic module perimeter, a back rail twice the length or the width, depending on how it is fixed, of the photovoltaic module.

SUMMARY

It is an object of the invention to provide a mounting interface for a photovoltaic module for mounting the photovoltaic module on the mounting surface, whereby the mounting interface realizes a secured fixation of the photovoltaic module with minimized material costs for the mounting device.

The object is achieved by the features of the independent claim. Preferred embodiments are given by the dependent claims.

Accordingly, the object is achieved by a mounting interface configured for a photovoltaic module comprising a backside having an overall backside surface size, the mounting interface comprising at least six mounting elements attachable to the backside of the photovoltaic module for mounting the photovoltaic module on a mounting surface, wherein each mounting element comprises a mounting element surface having an overall mounting element surface size such that the contact area between the photovoltaic module and the mounting element, when attached to the photovoltaic module, equals the overall mounting element surface size, and the overall backside surface size of the photovoltaic module divided by the summarized overall mounting element surface size of all mounting elements is $\geq 40$ and $\leq 160$, preferably $\geq 50$ and $\leq 80$, more preferably 52.

In order to optimize cost for mounting elements for mounting a photovoltaic module on a mounting surface, for example on a roof of a building, it is known from prior art to use four mounting elements, whereby their size is calculated accordingly. The determined factor for calculating the size of the mounting elements is often the effective area, i.e. the contact area, which is responsible for transferring forces from the photovoltaic module to a substructure, comprising, for example, bars or rails.

However, it has been found that by using six or more mounting elements it is possible to reduce the size of each mounting element such that the overall amount of material required for the mounting is reduced, resulting in minimized material costs. It has been further found that, when dimensioning the ratio of overall backside surface size of the photovoltaic module divided by the summarized overall mounting element surface size of all mounting elements is $\geq 40$ and $\leq 160$, preferably $\geq 50$ and $\leq 80$, more preferably 52, the requirements of IEC norm 61646 ed.2 section 10.16 are fully met. In sum, the mounting interface according to the invention provides a reduction in material usage by 70% compared to prior art systems having four mounting elements. Therefore, the idea of the invention is to optimize the number of mounting elements while satisfying before mentioned IEC criteria with the constraint on using minimal amount of material instead of a minimal number of elements.

Various tests have shown that the mounting interface according to the invention satisfies the requirements of IEC 61646 ed.2 section 10.16 by increasing the number of mounting elements while at the same time reducing the overall contact area between the mounting elements and the photovoltaic module. Having at least six mounting elements, instead of four mounting elements, means on the other side that the distance between the mounting elements attached to the photovoltaic module is reduced so that the effective contact area between the mounting elements and the photovoltaic module can be decreased without compromising fixation and/or stabilization of the fixation of the photovoltaic module on the mounting surface. A further advantage decreasing the distance between the six or more mounting elements is that the mechanical stress in the photovoltaic module is reduced, thus leading to an increase of the safety level of the overall mounting solution.

When using a frame or back rail as mounting substructure, one or two mounting elements are required, but these mounting elements known from prior art have to be formed with a big size to reach a secured fixation of the photovoltaic module, since the deformation of the photovoltaic module along its longitudinal side surface are bigger. However, when using six or more mounting elements according to the invention along the longitudinal side surface of the photovoltaic module, the deformation of the photovoltaic module along its longitudinal side surface are much smaller compared to prior art.

The photovoltaic module can be any photovoltaic module known from prior art, having an overall backside surface size of, for example, 1,4 m². Each mounting element preferably has a physical contact size, when attached to the photovoltaic module, with the photovoltaic module that is the overall mounting element surface size, for example, 9.000 mm². Therefore, it is according to the invention preferred that the overall backside surface size of the photovoltaic module, for example 1,4 m², divided by the summarized overall mounting element surface size of all mounting elements, for example 6×9.000 mm² in the case of six mounting elements, is ≥40 and ≤160, preferably ≥50 and ≤180, more preferably 52, respectively 156 in the above example. While each of these ratios, as long as preferably ≥40 and ≤160, have been found to satisfy the requirements of IEC 61646, it has been found during various tests that especially the ratio of 52 provides the best results in terms of low material use, secure fixation and optimized costs.

Generally, the mounting element surface that is attachable to the photovoltaic module respectively attached to the photovoltaic module may comprise any shape suitable for mounting the photovoltaic module on the mounting surface. However, according to a preferred embodiment of the invention, the mounting element surface attachable to the photovoltaic module, which is preferably the contact area between the mounting element, when attached to the photovoltaic module, and the photovoltaic module, is rectangular shaped having a length between ≥130 mm and ≤170 mm, preferably ≥140 mm and ≤160 mm, most preferably 150 mm, and a width between ≥10 mm and ≤40 mm, preferably ≥20 mm and ≤30 mm, most preferably 30 mm.

In a further preferred embodiment the mounting element surface attachable to the photovoltaic module is circular shaped having a diameter of ≥44 mm and ≤87 mm, preferably ≥60 mm and ≤80 mm, more preferably 76 mm. Moreover, the man skilled in the art may use further shapes having different width, length and/or diameters for the mounting element respectively for the mounting element surface attachable to the photovoltaic module, especially when using much more than six mounting elements for mounting the photovoltaic module.

In another preferred embodiment, the mounting element surfaces attachable to the photovoltaic module of all mounting elements comprise the same shape. Such embodiment provides for a very simple manufacturing of the mounting elements as well as a reduced mechanical stress in the photovoltaic module. The man skilled in the art may provide further mounting means for fixing the mounting elements onto the mounting surface, such as, for example substructures, frames, bars and/or rails.

Therefore, according to another preferred embodiment of the invention the mounting elements are arranged in rows, preferably with three mounting elements in a row. Such assembly is especially advantageous for photovoltaic modules having a longitudinal side surface between 1 m² and 2 m². The mounting elements are then preferably systematically arranged for reaching a secured fixation over the whole longitudinal side surface of the photovoltaic module. In order to reduce the mechanical stress in the photovoltaic module module further, resulting in a better safety level of the mounting interface, it is preferred to arrange the mounting elements in a row with the same distance to each other.

Generally, the mounting element can be attached in any way possible to the photovoltaic module, for example by means of glue. However, according to a preferred embodiment of the invention, the mounting element comprises a fastener, a snap-on device, a clamp, a bolt, a notch, a pawl and/or a lock impeding device and/or electrical connection means, sensors and/or a control element for indicating the operational and/or mechanical condition of the photovoltaic module and/or of the mounting element. Preferably, the mounting element is attachable to the photovoltaic module and removable from the photovoltaic module without any further tools, such that the handling of the mounting interface can even be done by persons without any specialized knowledge.

The object of the invention is further addressed by a photovoltaic module with a mounting interface as described before for mounting the photovoltaic module on a mounting surface, wherein each mounting element is removably attached to the backside of the photovoltaic module. Thereby it is especially preferred, that each photovoltaic module is attached to the backside of the photovoltaic module by means of glue. As the mounting interface according to the invention provides for a reduced contact area between the mounting element and the photovoltaic module compared to prior art systems, such areal reduction allows for the use of smaller mounting elements as well as a reduction of the amount of glue required for securely fixing the photovoltaic module to the mounting element respectively to the mounting element surface, while satisfying the requirements according to IEC 61646.

In a further preferred embodiment of the invention, each mounting element is firmly bonded and/or attached to the backside fo the photovoltaic module. Firmly bonded in the meaning of the invention shall be understood as that the mounting element is welded, glued or otherwise fixated to the backside of the photovoltaic module in a way capable to compensate the forces arising from mechanical stress, like wind load, snow load and the like.

In an especially preferred embodiment of the invention, the photovoltaic module comprises a substrate, photovoltaically active layers and a cover, wherein the photovoltaically active layers are laminated between the substrate and the cover, the substrate and/or the cover comprises glass, preferably annealed glass, and the thickness of the glass is ≤3,2 mm, preferably ≤2 mm. Such embodiment is especially advantageous as it allows reducing the cost of photovoltaic modules to a minimum value, avoiding strengthening procedures on glass as well as reducing the glass thickness, while on the other side satisfying reliability requirements and avoiding the introduction of extra costs on the supporting structure.

During extensive tests it has been found that with at least six mounting devices a 2 mm annealed glass respectively a 2 mm annealed glass laminated photovoltaic module satisfies the IEC 61646 requirements for wind load and mechanical load tests. The man skilled in the art will provide the substrate, the photovoltaically active layers and/or the cover as any means known from prior art, for example as comprising a p-i-n or n-i-p structure as photovoltaically active layers.

Generally, the photovoltaic module may comprise any shape. However, according to a preferred embodiment of the invention, the backside of the photovoltaic module is rectangular shaped having an overall backside surface size of $\geq 1\ m^2$ and $\leq 2\ m^2$, preferably $\geq 1,2\ m^2$ and $\leq 1,7\ m^2$, most preferably $1,43\ m^2$. In a specially preferred embodiment the photovoltaic module exhibits a size of $1100 \times 1300\ mm^2$. Preferably, the photovoltaic module exhibits a square or rectangular, essentially flat and/or plane design, whereby the mounting elements are preferably "punctually attached" to the photovoltaic module individually without contacting each other. The mounting elements may be made from aluminum, steel, plastic or any other suitable material. Preferably, the mounting elements are arranged in a regular pattern, for example in a row and/or in a column.

According to another preferred embodiment of the invention, the photovoltaic module comprises a pivot attached to the mounting surface and the mounting element comprises a structural member exhibiting a receptacle configured for plugging the receptacle onto the pivot such that a detachable joint between the photovoltaic module and the mounting surface is formed. Therefore, for plugging the structural member onto the pivot, the photovoltaic module is preferably moved towards the surface of the structural member keeping the plane of the photovoltaic module parallel to the plane of the surface of the structural member. In this way, an array of photovoltaic modules can be arranged, wherein the photovoltaic modules, in general, do not require any lateral spacing for installation. Especially, no such installation space is required for any pivot motion of the module. This means that a module that needs to be exchanged due to damage can be removed and substituted by a new one like a tile of a tile array in a very simple manner. Such detachable joint makes the replacement of the photovoltaic module very easy, in case any malfunction of the photovoltaic module makes an exchange necessary.

According to a further preferred embodiment of the invention, the structural member comprises a fixation means configured for fixating the pivot in the receptacle when the receptacle is plugged onto the pivot. It is further preferred that the fixation means comprises a mechanical lock configured for interacting with a recess of the pivot when the receptacle is plugged onto the pivot.

In a further embodiment, the joint between the structural member and the pivot is detachable by affecting a magnetic force on the fixation means. Such embodiment will on one hand enable easy maintenance because the joint can be released from the front side of the module and there is no need to apply a tool on the backside of the module. On the other hand, such magnetic detachable fixation means can act as an anti-theft system.

In a further preferred embodiment, the structural member forms an integral part of the backside of the photovoltaic module. For example, the backside of the photovoltaic module may be formed by plastic injection moulding as one single piece, which will additionally reduce the manufacturing cost.

It is further preferred that the structural member is firmly bonded to the backside of the photovoltaic module. In an alternative embodiment of the invention, the joint between a structural member and a pivot is used to electrically connect the photovoltaic module to an electrical power network. Such embodiment will further reduce the costs of the photovoltaic module since additional electrical connection means can be omitted.

In another preferred embodiment, the pivot is automatically fixed in the receptacle, whereby automatically fixating the pivot in the receptacle preferably means that fixation of the pivot in the receptacle is simply achieved by inserting the pivot into the receptacle without further action. In this way, a "snap-on" solution for fixating the module on the surface can be provided. This allows for an easy installation of the module without using any further tools to fixate the module on the surface.

BRIEF DESCRIPTION OF THE DRAWINGS

These and other aspects of the invention will be apparent from and elucidated with reference to the embodiments described hereinafter.

In the drawings.

DETAILED DESCRIPTION

Figure 1:
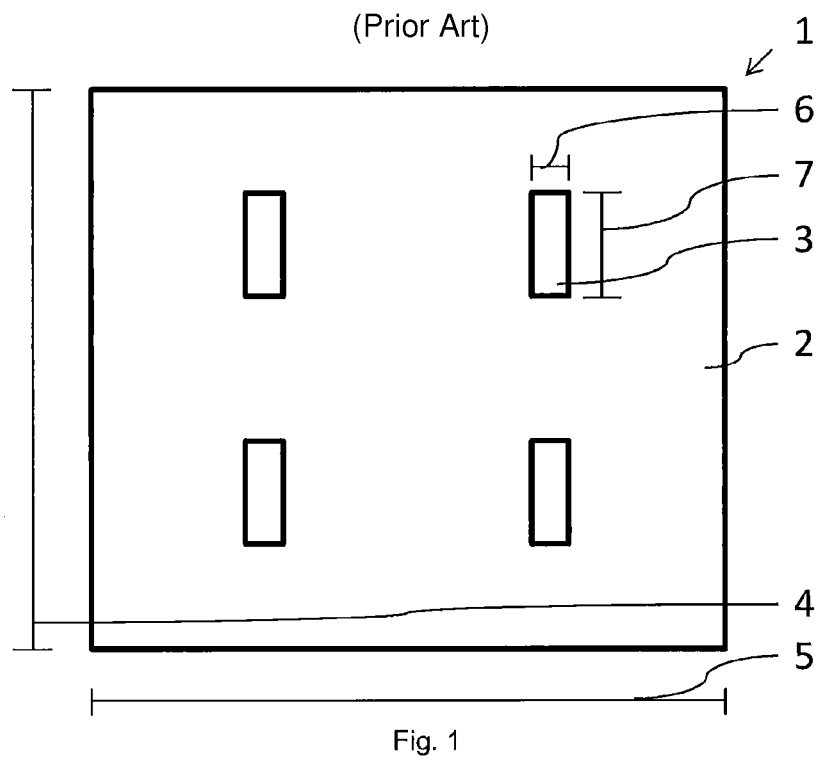
FIG. 1 shows a schematic view of a photovoltaic module with a mounting interface according to prior art.

FIG. 1 shows a schematic view of a photovoltaic module 1 with a mounting interface according to prior art for mounting the photovoltaic module 1 on a mounting surface. The photovoltaic module 1 has a backside 2 having overall rectangular backside surface size 4, 5 having a width 4 of 1300 mm and a length 5 of 1100 mm.

On the backside 2 of the photovoltaic module 1 four mounting elements 3 are defined. According to prior art, each mounting element 3 comprises a width 6 of 50 mm and a length 7 of 150 mm. The mounting elements 3 are attached by means of glue to the backside 2. Therefore, the effective contact area of the four mounting elements 3 is $4 \times 50\ mm \times 150\ mm = 30.000\ mm^2$.

Figure 2:
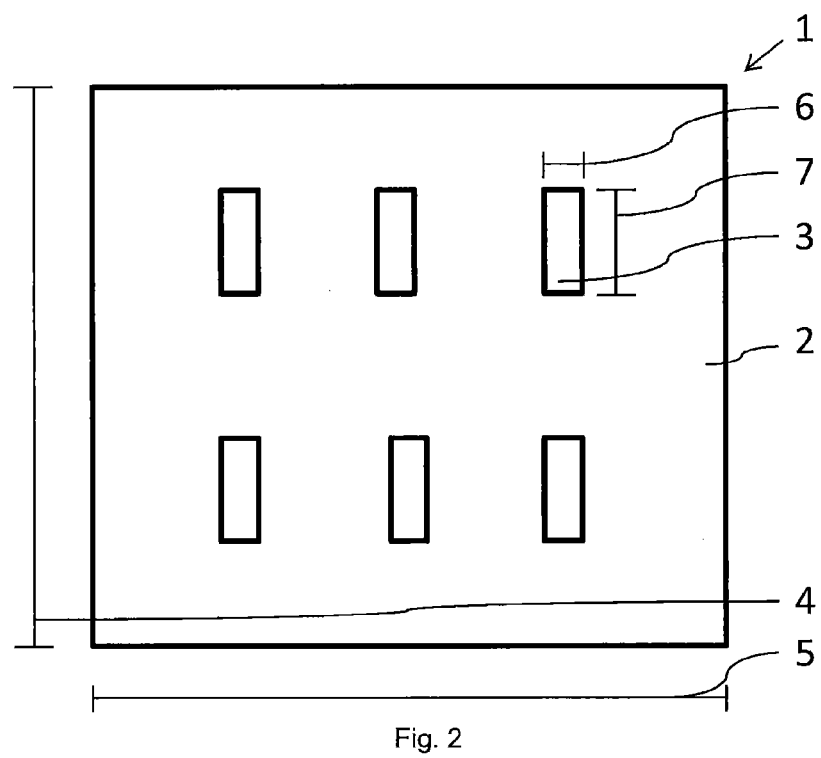
FIG. 2 shows a schematic view of a photovoltaic module with a mounting interface according to an embodiment of the invention.

FIG. 2 shows a photovoltaic module 1 according to a preferred embodiment of the invention. While having the same overall backside surface size 4, 5 of the photovoltaic module 1 as known from prior art, the amount of mounting elements 3 has been increased to a total number of six. Thereby, each mounting element 3 comprises a mounting element surface having an rectangular overall mounting element surface size 6, 7 of $10\ mm \times 150\ mm$ such that in sum the summarized overall mounting element surface size 6, 7 of all six mounting elements 3 is $9.000\ mm^2$.

As can be seen, the effective contact area between the overall backside surface size 4, 5 of the photovoltaic module 1 and the summarized overall mounting element surface size 6, 7 of all six mounting elements 3 has been drastically reduced compared to the prior art configuration with four mounting elements 3 only, while at the same time satisfying the constraints according to IEC 61646, for example complying to wind and/or snow load as defined in before-mentioned IEC norm.

Therefore, as shown before, the overall backside surface size 4, 5 of the photovoltaic module 1 divided by the summarized overall mounting element surface size 6, 7 of all six mounting elements 3 is 159. Various tests have shown that, as long as the ratio of overall backside surface size 4, 5 of the photovoltaic module 1 divided by the summarized overall mounting element surface size 6, 7 of all mounting elements 3 is ≥40 and ≤160, the requirements of IEC 61646 are met.

Arranging the mounting elements 3 in a row with three mounting elements 3 in a first row and the remaining three mounting elements 3 in a second row, and with equal distance to each other per row, as shown in FIG. 2, has the further advantage that the thickness of the glass used for the photovoltaic module 1 can be decreased to 2 mm while still satisfying the constraints according to IEC 61646. Thereby it is assumed that the photovoltaic module 1 comprises a substrate, photovoltaically active layers and a cover, as known from prior art, wherein the photovoltaically active layers are laminated between the substrate and the cover, and the substrate and the cover comprise annealed glass having a thickness of each 2 mm.

The mounting elements 3 are provided as fasteners exhibiting a lock impeding removal of the photovoltaic module 1 without tools. The fasteners further exhibit electrical connection and/or sensor or control elements (not shown) indicating the operational and mechanical condition of the photovoltaic module 1 and the mounting elements 3.

Figure 3:
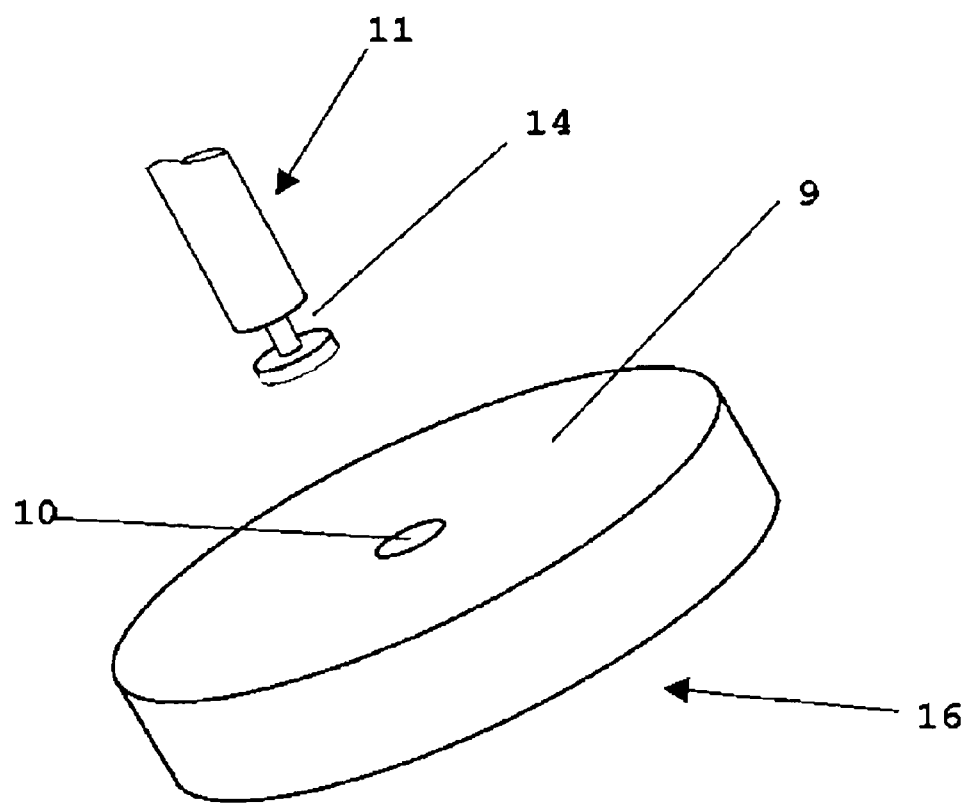
FIG. 3 shows a schematic view of a mounting interface according to another embodiment of the invention.

FIG. 3 depicts a possible fixture configuration that allows easy installation and de-installation. A structural member 9 exhibits a receptacle 10, e.g. a bore, which matches against a pin, plug or pivot 11. The pivot 11 is part of a structure (not shown) and/or mounting surface, the photovoltaic module 1 shall be attached to 16 is the backside of the structural member 9, which is glued, attached or otherwise connected to the backside 2 of the photovoltaic module 1. The geometry of the fixtures is not limited to be cylindrical or other.

Figure 4:
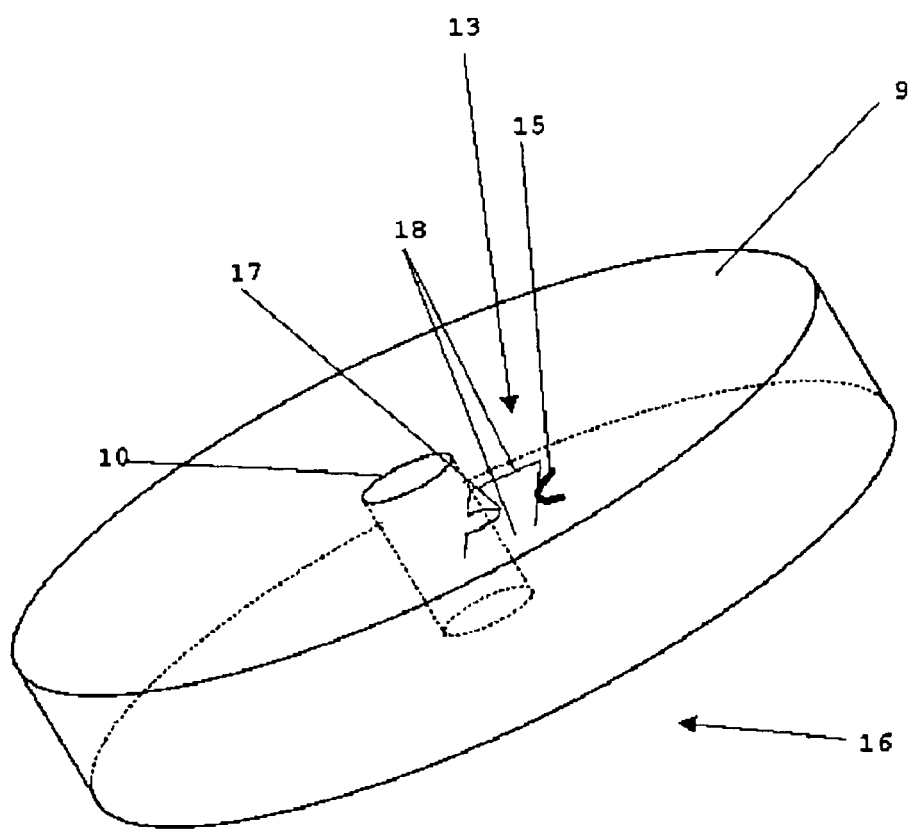
FIG. 4 shows a schematic view of a structural member of the mounting interface according to another embodiment of the invention.

FIG. 4 shows a further embodiment according to the invention. The structural member 9 as shown in FIG. 3 can be further modified to also provide a solution for anti-theft systems. For instance, a mechanical lock 13 can be integrated in the structural member 9 of FIG. 3 that allows the system to be demounted only by applying a force, e.g. a magnetic field, that allows opening the mechanical lock 13 by moving a locking plate 17 towards the right direction to unlock the mechanical lock 13 and release the pivot 11. With such a system, the photovoltaic module 1 can be mounted and removed directly from the top side, without any need of lateral spacing or complicated strategies to remove a damaged module on a power plant or installation.

This example is depicted in FIG. 4, wherein 18 represent guides for the locking plate 17 of the mechanical lock 13, which locking plate can be made from iron or another magnetic metal. Reference number 15 represents a spring which acts as locking means automatically fixating the locking plate in a locking position when the structural member 9 is plugged on the pivot 11. The spring may be made from harmonic steel or plastic.

While the invention has been illustrated and described in detail in the drawings and foregoing description, such illustration and description are to be considered illustrative or exemplary and not restrictive, the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

REFERENCE SIGNS LIST

1 photovoltaic module
2 backside of the photovoltaic module
3 mounting element
4 width of the photovoltaic module
5 length of the photovoltaic module
6 width of the mounting element
7 length of the mounting element
9 structural member
10 receptacle
11 pivot
13 mechanical lock
14 recess
15 spring
16 backside of the structural member
17 locking plate
18 guide

What is claimed is:

1. A photovoltaic module (1) comprising:
   a backside (2) having an overall backside surface size (4, 5); and
   a mounting interface comprising at least six mounting elements (3) being removeably attached to the backside (2) of the photovoltaic module (1) for mounting the photovoltaic module (2) on a mounting surface,
   wherein each mounting element (3) comprises a contact surface having a contact size (6, 7) such that a contact area between the photovoltaic module (1) and the mounting element (3) equals the contact size (6, 7),
   wherein the overall backside surface size (4, 5) of the photovoltaic module (1) divided by a summarized contact size (6, 7) of all mounting elements (3) is greater than or equal to 40 and less than or equal to 160,
   wherein the at least six mounting elements (3) comprise a structural member (9) exhibiting a receptacle (10) configured for plugging the receptacle (10) onto a pivot (11) attached to the mounting surface when the photovoltaic module (1) is moved towards the surface of the mounting surface, and
   wherein a detachable joint between the photovoltaic module (1) and the mounting surface is formed, and
   wherein the structural member compises a fixation means configured for fixating the pivot (11) in the receptacle (10).

2. The photovoltaic module according to claim 1, wherein the contact surface is rectangular shaped having a length (7) greater than or equal to 130 mm and less than or equal to 170 mm, and a width (6) greater than or equal to 10 mm and less than or equal to 40 mm.

3. The photovoltaic module according to claim 1, wherein the contact surface is circular shaped having a diameter of greater than or equal to 44 mm and less than or equal to 87 mm.

4. The photovoltaic module according to claim 1, wherein the contact surface of all mounting elements (3) comprise a same shape.

5. The photovoltaic module according to claim 1, wherein the mounting elements (3) are arranged in rows.

6. The photovoltaic module according to claim 5, wherein the mounting elements (3) are arranged in a row with a same distance to each other.

7. The photovoltaic module according to claim 1, wherein the mounting element (3) comprises a fastener, a snap-on device, a clamp, a bolt, a notch, a pawl and/or a lock impeding device and/or electrical connection means, sensors and/or a control element for indicating the operational and/or mechanical condition of the photovoltaic module (1) and/or of the mounting element (3).

8. A photovoltaic module (1) according to claim 1, wherein each mounting element (3) is attached to the backside (2) of the photovoltaic module (1) by means of glue.

9. A photovoltaic module (1) according to claim 1, wherein each mounting element (3) is firmly bonded and/or attached to the backside (2) of the photovoltaic module (1).

10. The photovoltaic module (1) according to claim 1, wherein the photovoltaic module (1) comprises a substrate, photovoltaically active layers and a cover, and wherein the photovoltaically active layers are laminated between the substrate and the cover, the substrate and/or the cover comprises glass, and the thickness of the glass is less than or equal to 3.2 mm.

11. The photovoltaic module (1) according to claim 1, wherein the backside (2) of the photovoltaic module (1) is rectangular shaped having an overall backside surface size (3, 4) of greater than or equal to 1 $m^2$ and less than or equal to 2 $m^2$.

12. The photovoltatic module (1) according to claim 1, wherein the fixation means comprises a mechanical lock (13) configured for interacting with a recess (14) of the pivot (11).

* * * * *